US010365969B2

(12) United States Patent
Grube et al.

(10) Patent No.: US 10,365,969 B2
(45) Date of Patent: Jul. 30, 2019

(54) MULTIPLE WIRELESS COMMUNICATION SYSTEMS STREAM SLICES BASED ON GEOGRAPHY

(71) Applicant: International Business Machines Corporation, Armonk, NY (US)

(72) Inventors: Gary W. Grube, Barrington Hills, IL (US); Timothy W. Markison, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 15/687,338

(22) Filed: Aug. 25, 2017

(65) Prior Publication Data
US 2017/0357548 A1 Dec. 14, 2017

Related U.S. Application Data

(63) Continuation-in-part of application No. 13/647,518, filed on Oct. 9, 2012, now Pat. No. 9,798,616.
(Continued)

(51) Int. Cl.
*G06F 11/10* (2006.01)
*H04L 1/00* (2006.01)
(Continued)

(52) U.S. Cl.
CPC ........ *G06F 11/1076* (2013.01); *H04L 1/0041* (2013.01); *H04L 1/0045* (2013.01);
(Continued)

(58) Field of Classification Search
CPC ............. G06F 11/1076; G06F 11/1092; G06F 3/0619; G06F 3/0603; H04L 1/0041; H04L 1/0045; H04L 67/1097
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Shelly A Chase
(74) *Attorney, Agent, or Firm* — Garlick & Markison; Timothy W. Markison; Shayne X. Short

(57) ABSTRACT

A computing device includes an interface to communicate with a dispersed storage network (DSN), a memory, and a processing module. The computing device receives less than a decode threshold number of encoded data slices (EDSs) of a set of EDSs corresponding to a data object. The computing device also receives, from the second wireless communication system, at least one remaining EDS corresponding to the set of EDSs. the computing device combines the less than the decode threshold number of EDSs of the set of EDSs and the at least one remaining EDS to generate at least the decode threshold number of EDSs of the set of EDSs corresponding to the data object. The computing device dispersed error decodes the at least the decode threshold number of EDSs of the set of EDSs corresponding to the data object to reproduce the data segment of the plurality of data segments.

20 Claims, 8 Drawing Sheets

Related U.S. Application Data

(60) Provisional application No. 61/554,152, filed on Nov. 1, 2011.

(51) Int. Cl.
*H04L 29/08* (2006.01)
*H04W 12/02* (2009.01)
*H04L 29/06* (2006.01)

(52) U.S. Cl.
CPC ......... *H04L 67/1097* (2013.01); *H04W 12/02* (2013.01); *H04L 63/08* (2013.01); *H04L 63/101* (2013.01)

(56) References Cited

U.S. PATENT DOCUMENTS

| | | |
|---|---|---|
| 5,485,474 A | 1/1996 | Rabin |
| 5,557,639 A | 9/1996 | Heikkila et al. |
| 5,712,861 A | 1/1998 | Inoue et al. |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,625,233 B1 | 9/2003 | Carsello |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0007470 A1 | 1/2003 | Grilli et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0001462 A1 | 1/2004 | Yavuz et al. |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0049021 A1 | 3/2005 | Nedelcu et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0045015 A1 | 3/2006 | Nix et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2006/0280262 A1 | 12/2006 | Malladi |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0113143 A1 | 5/2007 | Liao et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2009/0222711 A1 | 9/2009 | Belogolovy |
| 2010/0023524 A1 | 1/2010 | Gladwin et al. |
| 2010/0287200 A1 | 11/2010 | Dhuse |
| 2011/0072210 A1* | 3/2011 | Dhuse ................ G06F 11/1076 711/114 |
| 2011/0126295 A1* | 5/2011 | Resch ................... G06F 21/64 726/27 |
| 2011/0161655 A1 | 6/2011 | Gladwin et al. |
| 2011/0231733 A1 | 9/2011 | Cilfone et al. |
| 2011/0275402 A1 | 11/2011 | Charipadi et al. |
| 2011/0286595 A1 | 11/2011 | Resch et al. |
| 2011/0289565 A1 | 11/2011 | Resch et al. |
| 2012/0030736 A1 | 2/2012 | Resch et al. |
| 2012/0311403 A1* | 12/2012 | Gladwin .............. H04L 65/602 714/763 |
| 2012/0324317 A1 | 12/2012 | Sripathi et al. |
| 2013/0017797 A1 | 1/2013 | Ramasamy et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Norking Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner distributed, or dispersed, storage network (DSN) 10

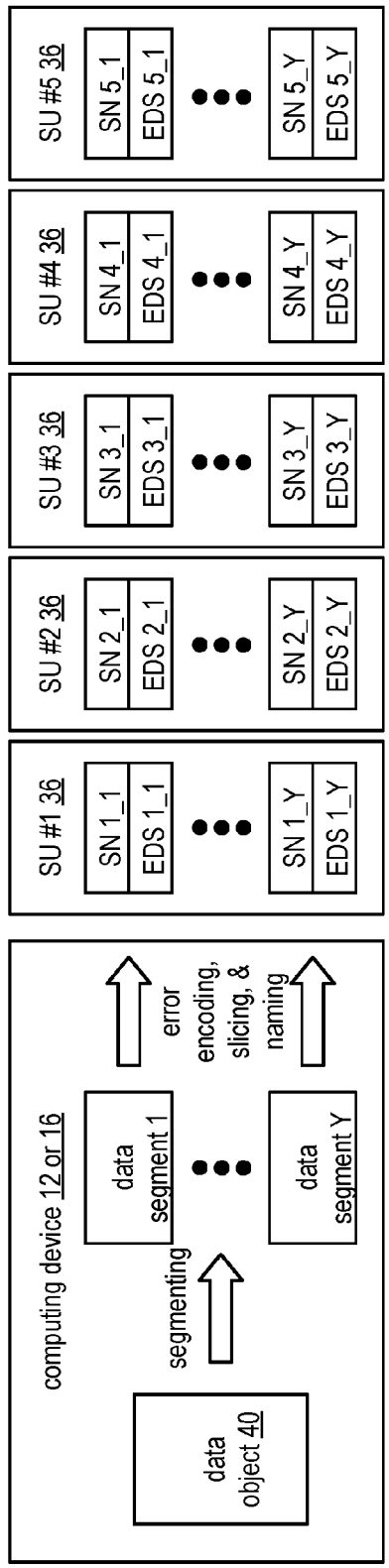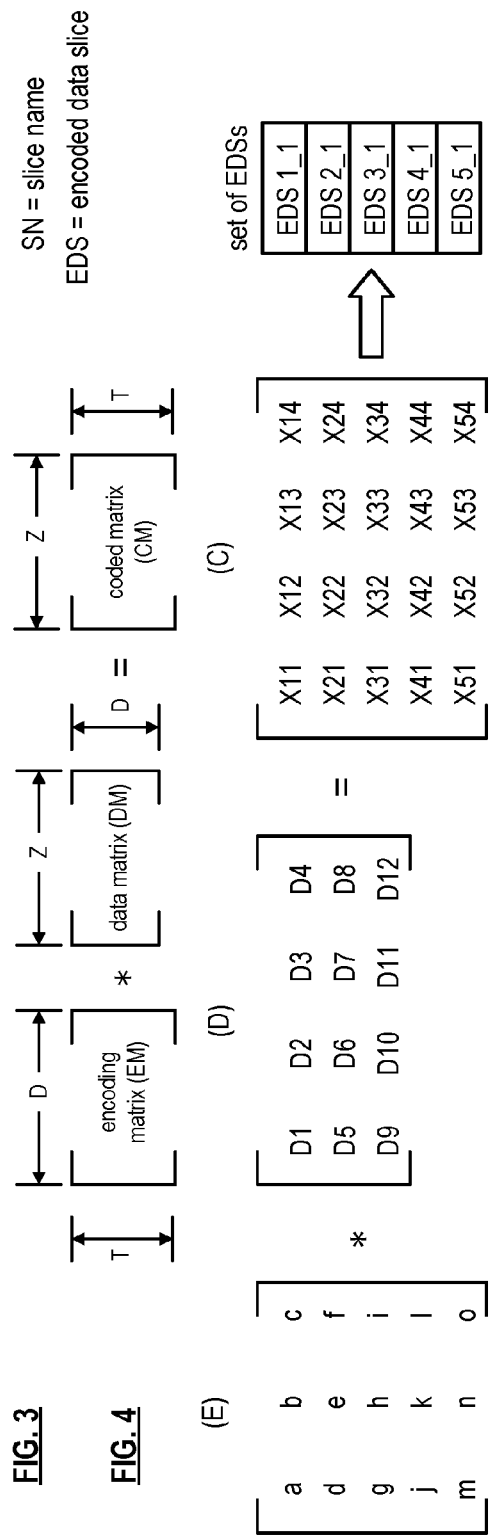

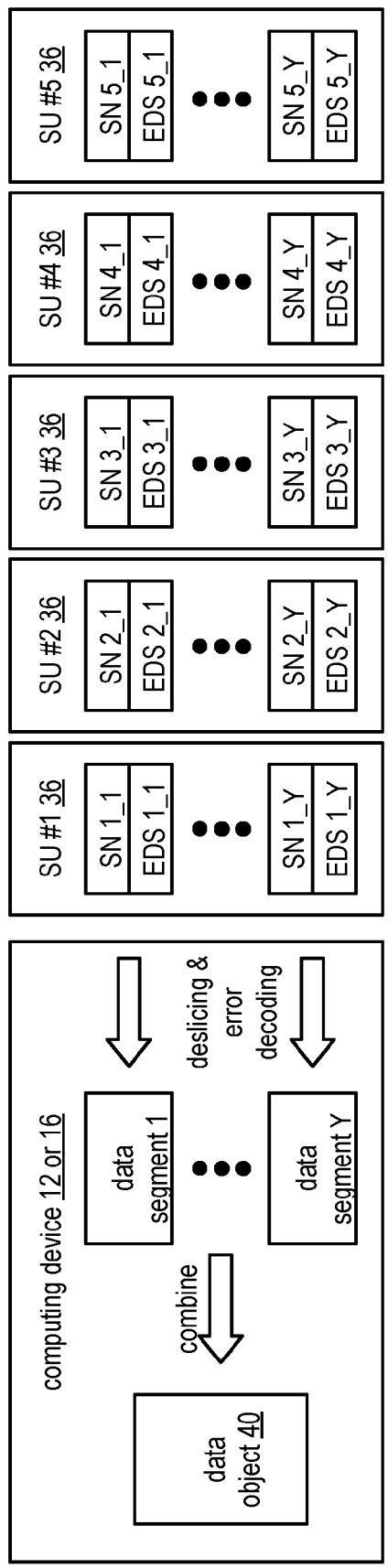

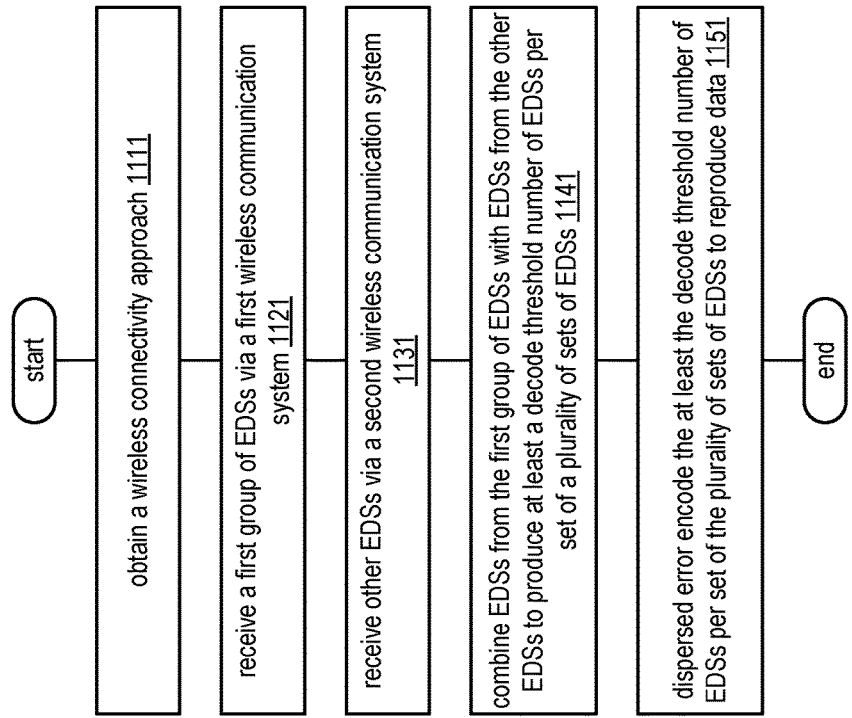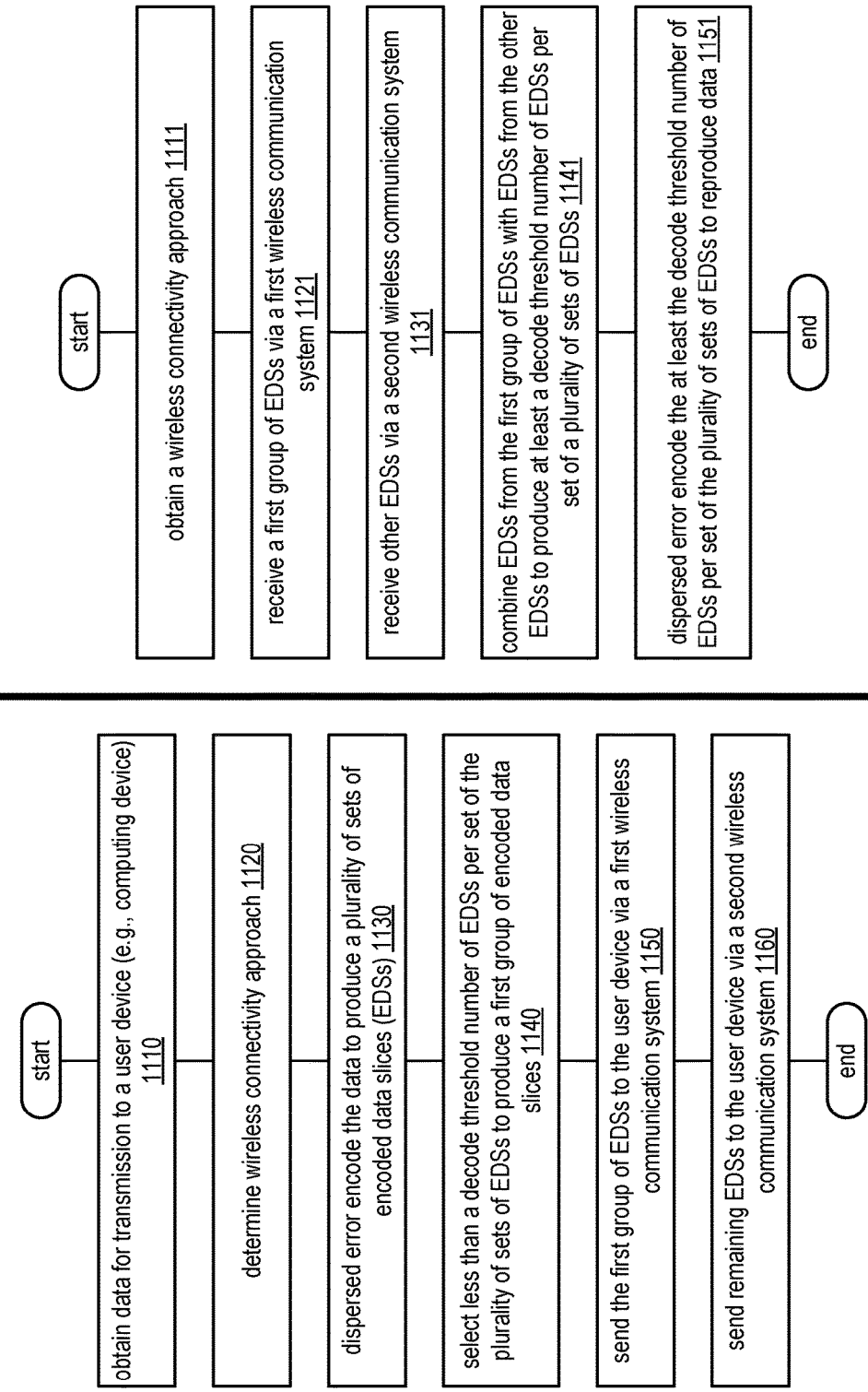
FIG. 11A
FIG. 11B

MULTIPLE WIRELESS COMMUNICATION SYSTEMS STREAM SLICES BASED ON GEOGRAPHY

CROSS REFERENCE TO RELATED PATENTS

The present U.S. Utility Patent Application claims priority pursuant to 35 U.S.C. § 120, as a continuation-in-part (CIP) of U.S. Utility patent application Ser. No. 13/647,518, entitled "Wirelessly Sending a Set of Encoded Data Slices," filed Oct. 9, 2012, pending, which claims priority pursuant to 35 U.S.C. § 119(e) to U.S. Provisional Application No. 61/554,152, entitled "Communicating Data Utilizing Data Dispersal," filed Nov. 1, 2011, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Certain prior art data storage systems are implemented based on a redundant drive approach called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

FIG. 11A is a flowchart illustrating an example of sending data in accordance with the invention;

FIG. 11B is a flowchart illustrating an example of receiving data in accordance with the invention;

DETAILED DESCRIPTION OF THE INVENTION

Figure 1:
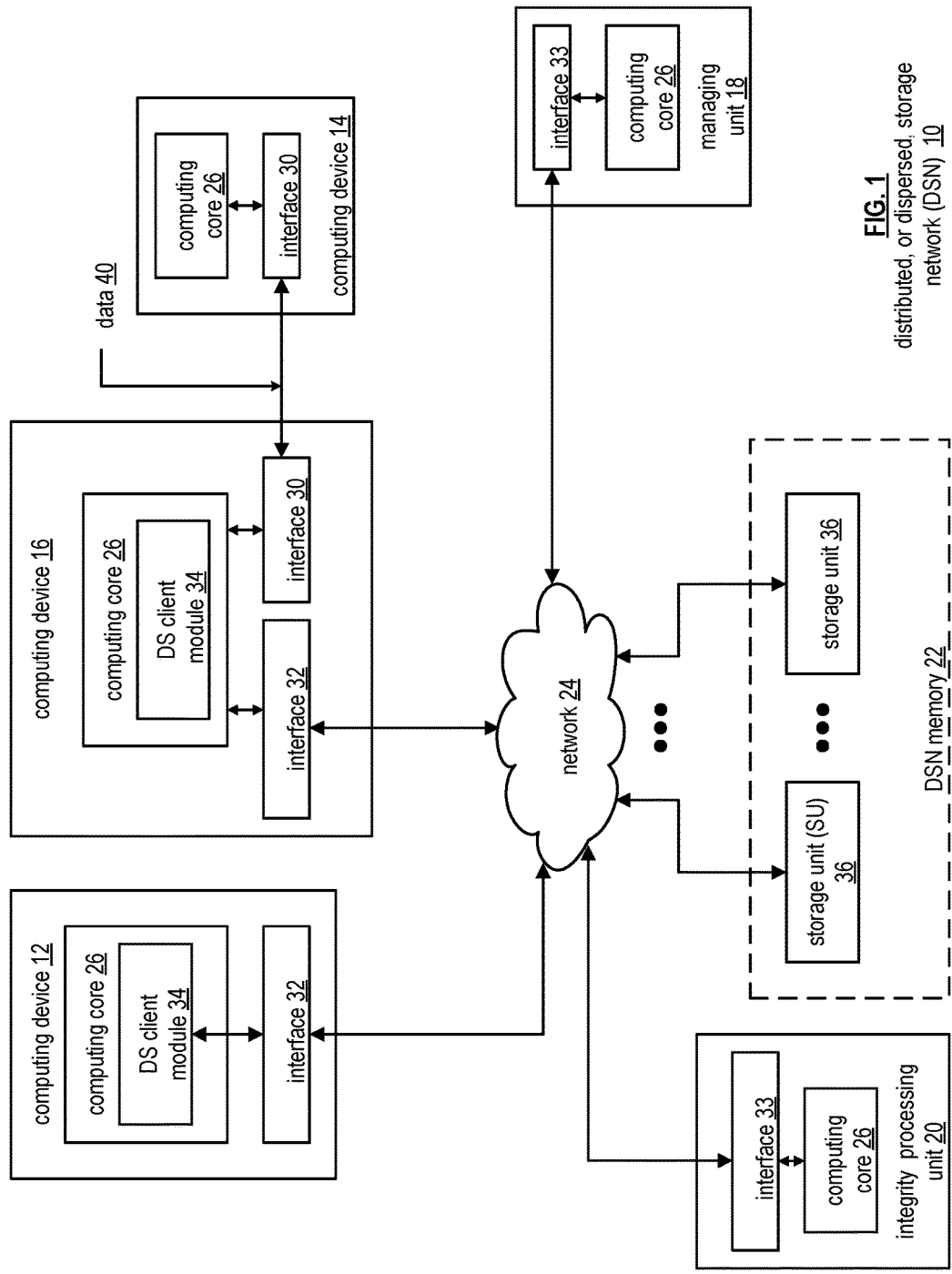
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
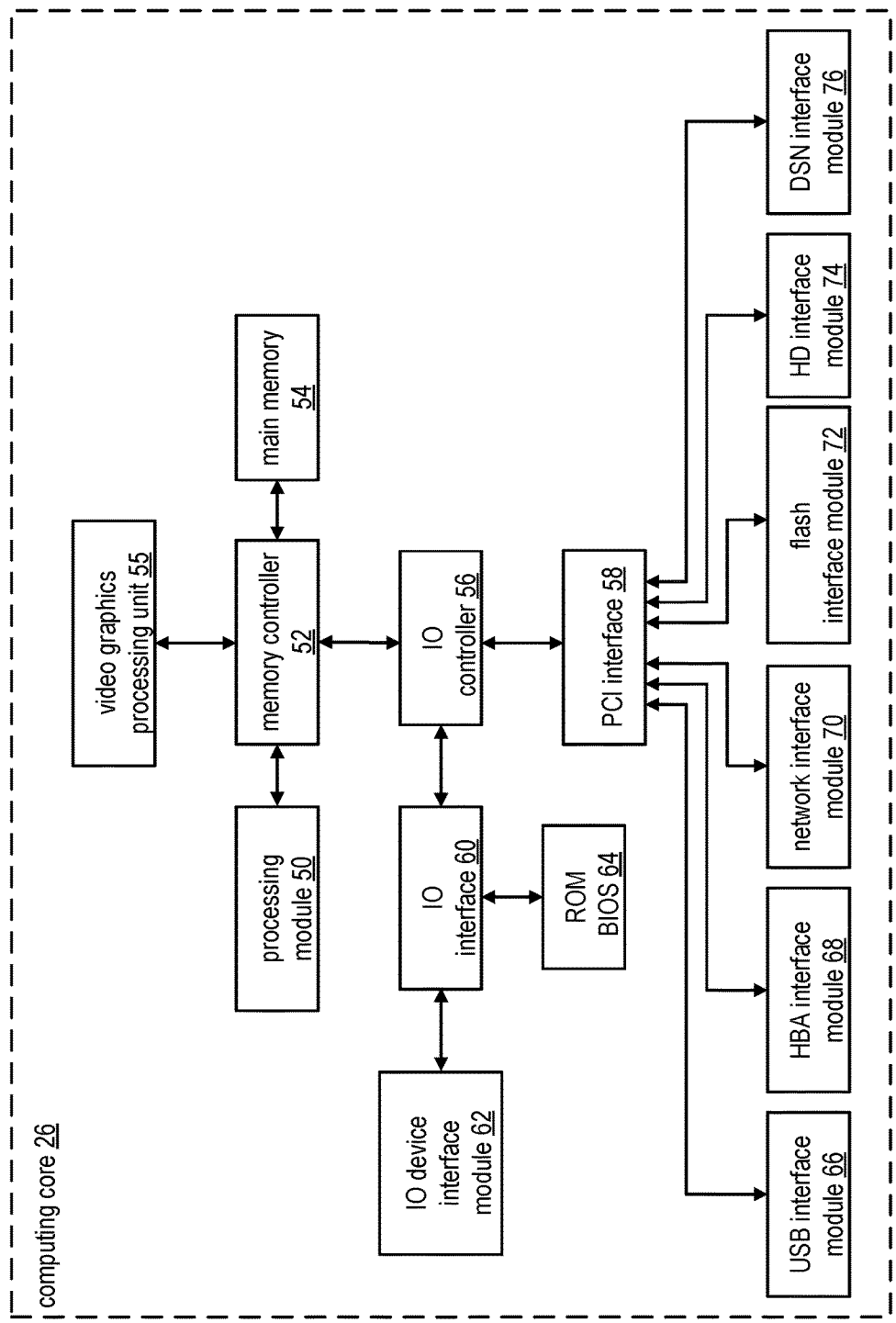
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In an example of operation and implementation, a computing device includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
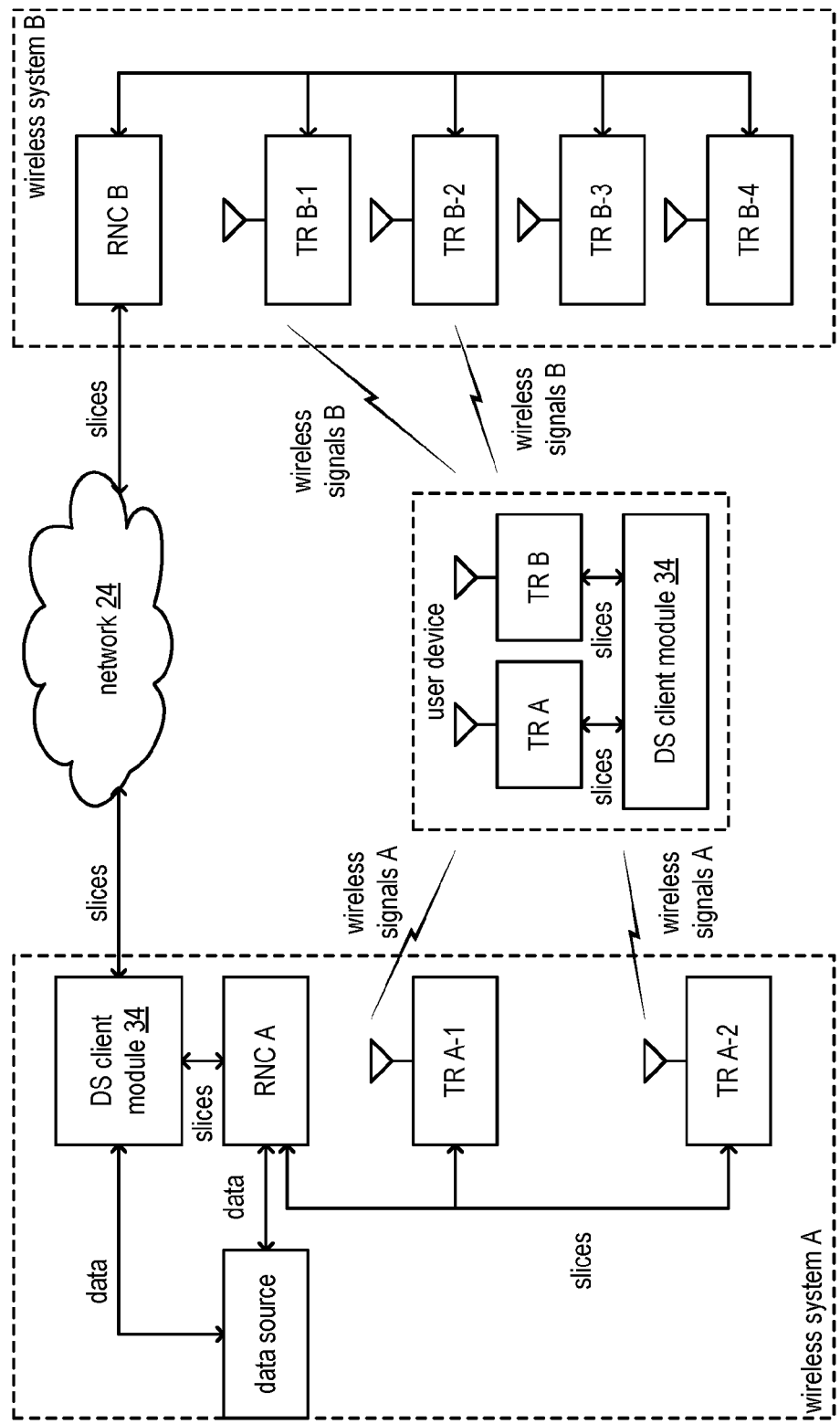
FIG. 9 is a schematic block diagram of another embodiment of a computing system in accordance with the invention.

FIG. 9 is a schematic block diagram 900 of another embodiment of a computing system. The system includes a user device, a wireless system A, a wireless system B, and a network 24. Alternatively, the system includes any number of wireless systems and any number of user devices. The wireless system A includes a DS client module 34 (e.g., of a computing device from FIG. 1 such as computing device 16), a data source, a radio network controller (RNC) A, and wireless transceivers TR A-1 and TR A-2. Alternatively, the wireless system A may include any number of data sources and any number of wireless transceivers. The data source includes one or more of an application server, a database, a data aggregator, a recording system output, a streaming media source, a dispersed storage network (DSN) memory, and a communication system output (e.g., cellular phone call traffic, radio dispatch traffic). The data source receives data from one or more inputs including a data output from the RNC A. The data source provides data to the DS client module 34. The data includes one or more of encoded data slices, a data file, a data stream, application data, commands, configuration information, communication traffic (e.g., telephony, group radio dispatch traffic), a video stream, an audio stream, a text file, a multimedia file, a database update, a list, reference information, and training information.

The DS client module 34 contains data and encodes the data to produce slices (e.g., encoded data slices (EDSs)). The DS client module 34 sends at least some of the slices to the user device via at least one of RNC A and wireless system B. The RNC A sends slices to one or more of TR A-1 and TR A-2 for wireless transmission as wireless signals A to the user device. The RNC A controls session continuity as the user device moves from site to site within a geographic coverage area of wireless system A.

The wireless system B includes a RNC B and wireless transceivers TR B-1, TR B-2, TR B-3, and TR B-4. Alternatively, the wireless system B may include any number of wireless transceivers. The RNC B receive slices from the wireless system A and sends a slice to one or more of TR B-1, TR B-2, TR B-3, and TR B-4. For wireless transmission as wireless signals B to the user device. The RNC B controls session continuity as the user device moves from site to site within a geographic coverage area of wireless system B.

The user device includes a transceiver TR A to communicate wireless signals A and a transceiver TR B to communicate wireless signals B. The TR A receives wireless signals A and produces slices. The TR B receives wireless signals B and produces slices. The DS client module 34 of the user device receives the slices from one or more of TR A and TR B and decodes the slices to reproduce data. Alternatively, a single transceiver may communicate wireless signals A and B. For example, the single transceiver communicates wireless signals A and B when the single transceiver is implemented utilizing software defined radio (SDR) technology.

The transceivers TR A-1 and TR A-2 communicate wireless signals A with transceiver TR A of the user device and may operate in accordance with one or more wireless industry standards including but not limited to universal mobile telecommunications system (UMTS), global system for mobile communications (GSM), long term evolution (LTE), wideband code division multiplexing (WCDMA), IEEE 802.11, IEEE 802.16, WiMax, Bluetooth, Association of Public Safety Communications Officers (APCO) Project 25, or any other local area network (LAN), wide area network (WAN), personal area network (PAN) or like wireless protocol. The transceivers TR B-1, TR B-2, TR B-3, and TR B-4 to communicate wireless signals B with the transceiver TR B of the user device and may operate in accordance with the one or more wireless standards. Such wireless signals A and B may simultaneously operate in accordance with different wireless industry standards. The wireless signals may be transmitted in accordance with anyone of a broadcast scheme, a unicast scheme, and a multicast scheme.

The wireless system A may provide a different wireless coverage footprint as compared to wireless system B. For example, wireless system A may provide a private wireless system (e.g., police and fire department communication) where range per site and total cost is more important than high user density per unit of area covered. As another example, wireless system B may provide a public wireless system (e.g., a cellular carrier) where low-cost per user and a high density per unit of area covered is more important than wireless range per site. For instance, wireless coverage cells of wireless system A may be much larger in diameter than wireless coverage cells of wireless system B.

Figure 10:
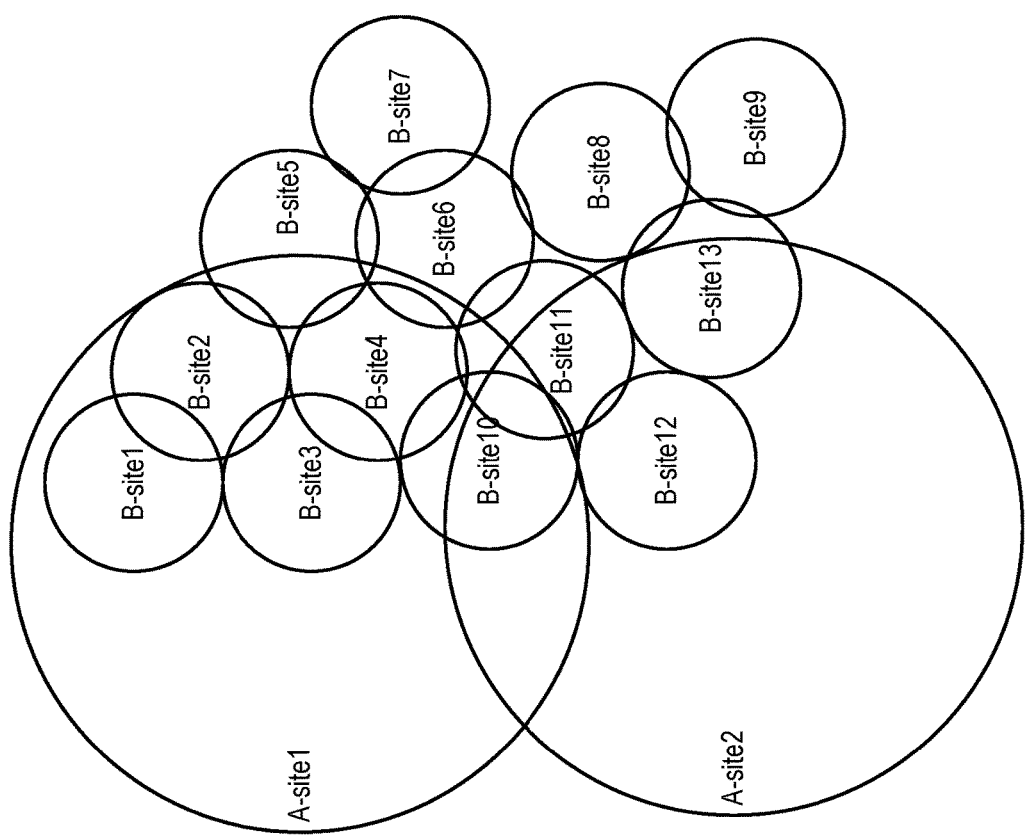
FIG. 10 is a diagram illustrating an example of wireless communication system coverage in accordance with the invention.

FIG. 10 is a diagram illustrating an example 1000 of wireless communication system coverage that includes a plurality of wireless system A coverage cells A-site1 through A-site2 and a plurality of wireless system B coverage cells B-site1 through B-site13. The wireless system A includes wireless coverage cells that are larger than coverage cells of the wireless system B. At any geographic location, coverage may be provided from neither, one, or both wireless systems A and B. With respect to the coverage from one of the two wireless systems A and B, overlapping coverage may be provided by two sites of the same wireless system.

Individual cells of wireless system B provide at least one of unique coverage (e.g., not overlapping with wireless system A), partially overlapping coverage, and fully overlapping coverage (e.g., a cell of wireless system A fully overlaps coverage of a site of wireless system B). For example, wireless system B sites B-site7 through B-site9 provide unique coverage, wireless system B sites B-site5 and B-site6 provide partially overlapping coverage with wireless system A site A-site1, wireless system B site B-site11 provides partially overlapping coverage with wireless system A sites A-site1 and A-site2, wireless system B site B-site13 provides partially overlapping coverage with wireless system A site A-site2, wireless system B site B-site10 provides fully overlapping coverage with wireless system A sites A-site1 and A-site2, wireless system B sites B-site1 through B-site4 provides fully overlapping coverage with wireless system A site A-site1, and wireless system B site B-site12 provides fully overlapping coverage with wireless system A site A-site2.

A system performance and security improvement may be provided by leveraging coverage characteristics of wireless systems A and B to wirelessly communicate data as encoded data slices to a user device that traverses an aggregate coverage area of both of the wireless systems. Methods to communicate the data to the user device are discussed in greater detail with reference to FIGS. 11A-12B.

In some examples, a computing device that includes the DS client module 34 is implemented to include an interface configured to interface and communicate with a dispersed or distributed storage network (DSN), a memory that stores operational instructions, and a processing module operably coupled to the interface and to the memory, wherein the processing module, when operable within the computing device based on the operational instructions, is configured to perform various operations and functions.

For example, computing device is configured to receive, from the first wireless communication system, less than a decode threshold number of encoded data slices (EDSs) of a set of EDSs corresponding to a data object. Note that the data object is segmented into a plurality of data segments, and a data segment of the plurality of data segments is dispersed error encoded in accordance with dispersed error encoding parameters to produce the set of EDSs. Also, a decode threshold number of EDSs are needed to recover the data segment. The computing device is also configured to receive, from the second wireless communication system, at least one remaining EDS corresponding to the set of EDSs corresponding to the data object. the computing device is also configured to combine the less than the decode threshold number of EDSs of the set of EDSs and the at least one remaining EDS to generate at least the decode threshold number of EDSs of the set of EDSs corresponding to the data object. Then, the computing device is configured to dispersed error decode the at least the decode threshold number of EDSs of the set of EDSs corresponding to the data object to reproduce the data segment of the plurality of data segments.

In some examples, the computing device is also configured to receive, from the first wireless communication system, less than the decode threshold number of EDSs of another set of EDSs corresponding to the data object. The computing device is also configured to receive, from the second wireless communication system, at least one other remaining EDS corresponding to the other set of EDSs corresponding to the data object. The computing device is also configured to combine the less than the decode threshold number of EDSs of the other set of EDSs and the at least one other remaining EDS to generate another at least the decode threshold number of EDSs of the other set of EDSs corresponding to the data object.

The computing device is configured to dispersed error decode the at least the decode threshold number of EDSs of the other set of EDSs corresponding to the data object to reproduce another data segment of the plurality of data segments. Then, the computing device is also configured to reproduce the data object based on the data segment of the plurality of data segments that is reproduced and the other data segment of the plurality of data segments that is reproduced.

In some examples, note that the less than the decode threshold number of EDSs of the set of EDSs corresponding to the data object corresponds to a unique subset of EDSs of the set of EDSs corresponding to the data object and is received from a first site of the first wireless communication system. Also, in some examples, note that the less than the decode threshold number of EDSs of the other set of EDSs corresponding to the data object corresponds to another unique subset of EDSs of the other set of EDSs corresponding to the data object and is received from a second site of the first wireless communication system.

The different respective wireless communication systems (e.g., first and second) may be of various types. In one example, the first wireless communication system includes a public wireless communication system, and the second wireless communication system includes a private wireless communication system.

In even other examples, a computing device is configured to receive, from the first wireless communication system, a plurality of unique subsets of less than a decode threshold number of encoded data slices (EDSs) per set of a plurality of sets of EDSs corresponding to a data object. The data object is segmented into a plurality of data segments, and a data segment of the plurality of data segments is dispersed error encoded in accordance with dispersed error encoding parameters to produce a set of the plurality of sets of EDSs. Also, a decode threshold number of EDSs are needed to recover the data segment. The computing device is also configured to receive, from the second wireless communication system, at least one remaining EDS for each of the plurality of unique subsets of less than the decode threshold number of EDSs per set of the plurality of sets of EDSs corresponding to the data object. The computing device is configured to combine EDSs from the plurality of unique subsets of less than the decode threshold number of EDSs per set of the plurality of sets of EDSs corresponding to the data object and the at least one remaining EDS for each of the plurality of unique subsets of less than the decode threshold number of EDSs per set of the plurality of sets of EDSs corresponding to the data object to generate at least the decode threshold number of EDSs for each of the plurality of sets of EDSs corresponding to the data object.

The computing device is then configured to dispersed error decode the at least the decode threshold number of EDSs of the set of EDSs for each of the plurality of sets of EDSs corresponding to the data object to reproduce the plurality of data segments to reproduce the data object.

In some examples, a first unique subset of less than the decode threshold number of EDSs per set of the plurality of sets of EDSs corresponding to the data object is received from a first site of the first wireless communication system, and a second unique subset of less than the decode threshold number of EDSs per set of the plurality of sets of EDSs corresponding to the data object is received from a second site of the first wireless communication system.

In some examples, note that the decode threshold number of EDSs are needed to recover the data segment, and a read threshold number of EDSs provides for reconstruction of the data segment. The set of EDSs is of pillar width and includes a pillar number of EDSs, and each of the decode threshold, the read threshold, and the write threshold is less than the pillar number. Also, in some examples, the write threshold number is greater than or equal to the read threshold number that is greater than or equal to the decode threshold number.

The computing device may be implemented as any of a number of different devices including a managing unit that is remotely located from the other computing device within the DSN and also remotely located from at least one SU of the plurality of SUs within the DSN. In other examples, the computing device may be implemented as a SU of the plurality of SUs within the DSN, a wireless smart phone, a laptop, a tablet, a personal computers (PC), a work station, or a video game device. Also, the DSN may be implemented to include or be based on any of a number of different types of communication systems including a wireless communication system, a wire lined communication systems, a non-public intranet system, a public internet system, a local area network (LAN), and/or a wide area network (WAN).

FIG. 11A is a flowchart illustrating an example of sending data. The method 1101 begins with a step 1110 where a processing module (e.g., a dispersed storage (DS) processing of an infrastructure element) obtains data for transmission to a user device. The obtaining includes at least one of outputting a query, a lookup, requesting the data from a data source, receiving the data from the data source, and receiving the data from a radio network controller (RNC).

The method 1101 continues at the step 1120 where the processing module determines a wireless connectivity approach. The wireless connectivity approach includes one or more of dispersal parameters (e.g., pillar width, a decode threshold, an information dispersal algorithm), a slice selection approach per set of slices (e.g., how many slices relative to the decode threshold percent to select), a slice partitioning approach (e.g., dividing each slice into two or more portions), a slice to wireless system association (e.g., how many and which slices per set of slices to send via which wireless communication system). The determination may be based on one or more of wireless system information associated with a plurality of wireless systems (e.g., capabilities, capacity, availability, performance, cost) and transmission requirements (e.g., performance, security, reliability). For example, the processing module determines to send less than a decode threshold number of slices per set of slices via a first wireless communication system and to send remaining slices per set of slices via a second wireless communication system when an above-average level of security is required and sufficient capacity is available in the first communication system to send the less than a decode threshold number of slices.

The method 1101 continues at the step 1130 where the processing module dispersed storage error encodes the data to produce a plurality of sets of encoded data slices utilizing dispersal parameters (e.g., in accordance with the wireless connectivity approach). The method 1101 continues at the step 1140 where the processing module selects less than a decode threshold number of encoded data slices per set of the plurality of sets of encoded data slices to produce a first group of encoded data slices. For example, the processing module selects a first decode threshold-1 pillar slices of each set of encoded data slices.

The method 1101 continues at the step 1150 where the processing module sends the first group of encoded data slices to the user device via a first wireless communication system. The sending includes one or more of sending the first group of encoded data slices in accordance with the wireless connectivity approach, sending the first group of encoded data slices to an RNC of the first wireless communication system, and sending the first group of encoded data slices to one or more transceivers associated with the first wireless communication system, wherein the one or more transceivers are affiliated with the user device (e.g., within wireless range, connected indicated by site registration information).

The method 1101 continues at the step 1160 where the processing module sends remaining encoded data slices (e.g., at least enough slices to provide a decode threshold number of slices in total, all remaining slices per set such that they pillar width number of slices are sent in total) to the user device via a second wireless communication system. The sending includes one or more of sending the remaining encoded data slices in accordance with the wireless connectivity approach, sending the remaining encoded data slices to an RNC of the second wireless communication system, and sending the remaining encoded data slices to one or more transceivers associated with the second wireless communication system, wherein the one or more transceivers of the second wireless communication system are affiliated with the user device (e.g., within wireless range of the transceiver of the second wireless communication system, connected indicated by site registration information of the second wireless communication system). In addition, the processing module may send the wireless connectivity approach to the user device.

FIG. 11B is a flowchart illustrating an example of receiving data. The method 1102 begins with a step 1111 where a processing module (e.g., a dispersed storage (DS) processing of a user device) obtains a wireless connectivity approach. The obtaining includes at least one of outputting a query, receiving a response, a lookup, requesting the approach from a DS processing unit, receiving the approach from the DS processing unit, and receiving the approach from a radio network controller (RNC).

The method 1102 continues at the step 1121 where the processing module receives a first group of encoded data slices via a first wireless communication system in accordance with the wireless connectivity approach. The method 1102 continues at the step 1131 where the processing module receives other encoded data slices via a second wireless communication system in accordance with the wireless connectivity approach. The method 1102 continues at the step 1141 where the processing module combines encoded data slices from the first group of encoded data slices with encoded data slices from the other encoded data slices to produce at least a decode threshold number of encoded data slices per set of a plurality of sets of encoded data slices. For example, the processing module starts with the first group of encoded data slices and supplements each set with other encoded data slices to produce the at least the decode threshold number of encoded data slices per set. The method 1102 continues at the step 1151 where the processing module dispersed storage error decodes the at least the decode threshold number of encoded data slices per set of the plurality of sets of encoded data slices to reproduce data in accordance with the wireless connectivity approach.

Figure 12A:
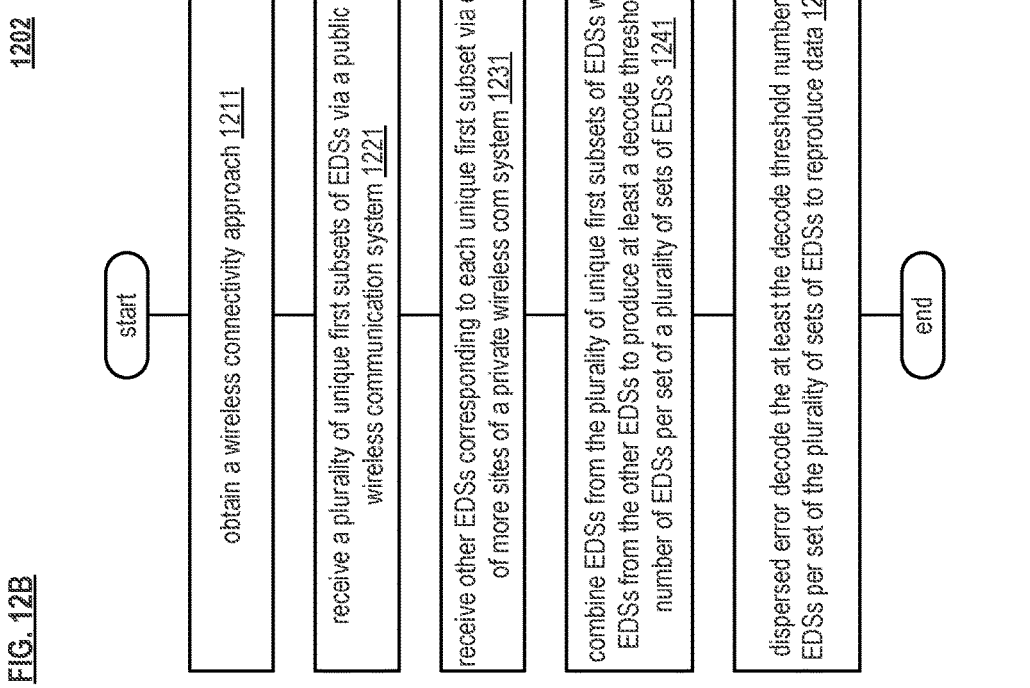
FIG. 12A is a flowchart illustrating another example of sending data in accordance with the invention.

FIG. 12A is a flowchart illustrating another example of sending data, which includes some similar steps to FIG. 11A. The method 1201 begins with some steps that are similar to FIG. 11A where a processing module (e.g., a dispersed storage (DS) processing of an infrastructure element) obtains data for transmission to a user device in step 1210, determines a wireless connectivity approach in step 1220, and dispersed storage error encodes the data to produce a plurality of sets of encoded data slices in step 1230. The method 1201 continues at the step 1240 where the processing module selects a unique combination of less than a decode threshold number of encoded data slices per set of the plurality of sets of encoded data slices to produce a plurality of unique first subsets of encoded data slices in accordance with the wireless connectivity approach. For example, the processing module selects slices 1-9 of a first set, slices 1, 3-10 of a second set, slices 1-2, 4-10 of a third set, etc.

The method 1201 continues at the step 1250 where the processing module sends the plurality of unique first subsets of encoded data slices to the user device via corresponding sites of a public wireless communication system. The sending includes one or more of sending the plurality of unique first subsets of encoded data slices in accordance with the wireless connectivity approach, sending the plurality of unique first subsets of encoded data slices to a radio network controller (RNC) of the public wireless communication system, and sending the plurality of unique first subsets of encoded data slices to one or more transceivers associated with the public wireless communication system, wherein the one or more transceivers are affiliated with the user device (e.g., within wireless range, connected indicated by site registration information). For example, processing module sends slices 1-9 of the first set of slices to a first transceiver of the public wireless communication system, slices 1, 3-10 of the second set of slices to a second transceiver of the public wireless communication system, and slices 1-2, 4-10 of the third set of slices to a third transceiver of the public wireless communication system when a decode threshold is 10 and a pillar width is 16.

The method 1201 continues at the step 1260 where the processing module sends remaining encoded data slices (e.g., at least enough slices to provide a decode threshold number of slices in total, all remaining slices per set such that they pillar width number of slices are sent in total) corresponding to each unique first subset of encoded data slices to the user device via corresponding sites of a private wireless communication system. Such a corresponding site of the private wireless committee should system includes overlapping wireless coverage with a corresponding site of the public wireless immigration system. The sending includes one or more of sending the remaining encoded data slices in accordance with the wireless connectivity approach, sending the remaining encoded data slices to an RNC of the private wireless communication system, and sending the remaining encoded data slices to one or more transceivers associated with the private wireless communication system, wherein the one or more transceivers of the private wireless communication system are affiliated with the user device (e.g., within wireless range of the transceiver of the private wireless communication system, connected indicated by site registration information of the private wireless communication system). For example, processing module sends slices 10-16 of the first set of slices to a first transceiver of the private wireless communication system, slices 2, 11-16 of the second set of slices to a second transceiver of the private wireless communication system, and slices 3, 11-16 of the third set of slices to a third transceiver of the private wireless communication system when a decode threshold is 10, a pillar width is 16, and wireless coverage of transceivers 1-3 of the public wireless communication system is substantially the same as wireless coverage of transceivers 1-3 of the private wireless communication system. In addition, the processing module may send the wireless connectivity approach to the user device.

Figure 12B:
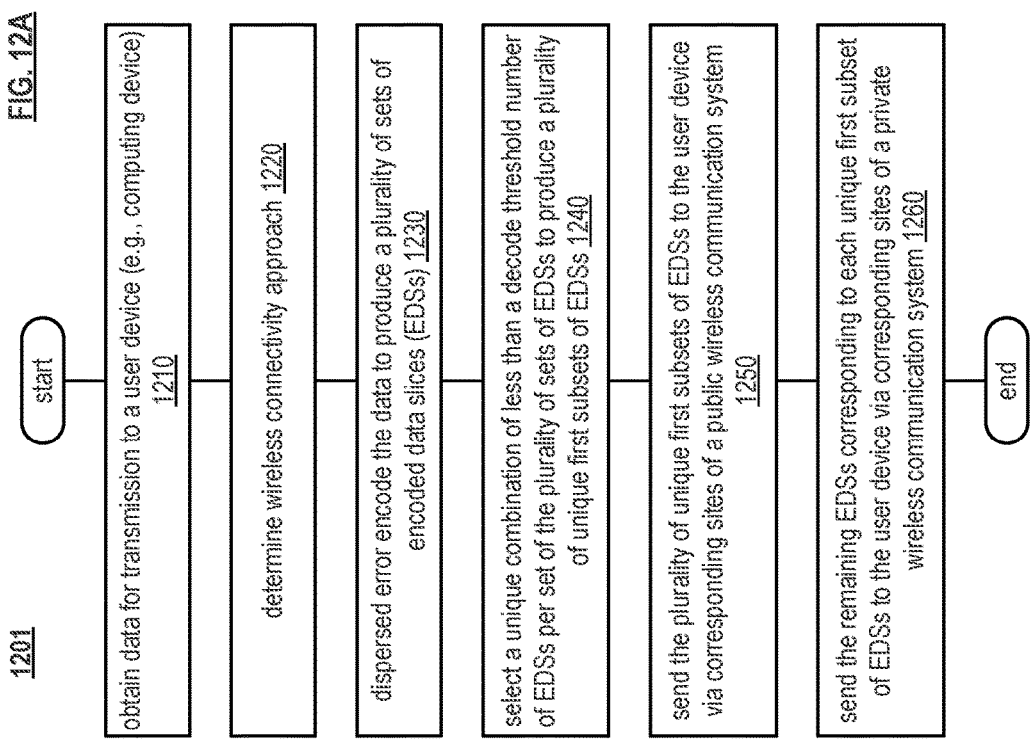
FIG. 12B is a flowchart illustrating another example of receiving data in accordance with the invention.

FIG. 12B is a flowchart illustrating another example of receiving data, which includes some similar steps to FIG. 11B. The method begins with some steps that are similar to FIG. 11B where a processing module (e.g., a dispersed storage (DS) processing of a user device) obtains a wireless connectivity approach 1211. The method continues at the step 1221 where the processing module receives a plurality of unique first subsets of encoded data slices via a public wireless communication system in accordance with the wireless connectivity approach.

The method continues at the step 1231 where the processing module receives other encoded data slices corresponding to each unique first subset via one or more sites of a private wireless communication system in accordance with the wireless connectivity approach. The method continues at the step 1241 where the processing module combines encoded data slices from the plurality of unique first subsets of encoded data slices with encoded data slices from the other encoded data slices to produce at least a decode threshold number of encoded data slices per set of a plurality of sets of encoded data slices. For example, the processing module starts with a unique first subset of encoded data slices and adds enough slices from one or more streams of slices from the private wireless communication system to produce the decode threshold number of encoded data slices per set. The method continues with a similar step of FIG. 11B in step 1251 where the dispersed storage error decodes the at least the decode threshold number of encoded data slices per set of the plurality of sets of encoded data slices to reproduce data.

In some alternative variants of methods described herein, a method operates by receiving, from a first wireless communication system and via an interface configured to interface and communicate with a dispersed or distributed storage network (DSN), the first wireless communication system, and a second wireless communication system, less than a decode threshold number of encoded data slices (EDSs) of a set of EDSs corresponding to a data object. Such a data object is segmented into a plurality of data segments, and a data segment of the plurality of data segments is dispersed error encoded in accordance with dispersed error encoding parameters to produce the set of EDSs. Also, a decode threshold number of EDSs are needed to recover the data segment. The method also operates by receiving, from the second wireless communication system and via the interface, at least one remaining EDS corresponding to the set of EDSs corresponding to the data object. The method continues by combining the less than the decode threshold number of EDSs of the set of EDSs and the at least one remaining EDS to generate at least the decode threshold number of EDSs of the set of EDSs corresponding to the data object. Such a method also operates by dispersed error decoding the at least the decode threshold number of EDSs of the set of EDSs corresponding to the data object to reproduce the data segment of the plurality of data segments.

In some examples, a variant of a method also operates by receiving, from the first wireless communication system and via the interface, less than the decode threshold number of EDSs of another set of EDSs corresponding to the data object. The method then operates by receiving, from the second wireless communication system and via the interface, at least one other remaining EDS corresponding to the other set of EDSs corresponding to the data object. The method then continues by combining the less than the decode threshold number of EDSs of the other set of EDSs and the at least one other remaining EDS to generate another at least the decode threshold number of EDSs of the other set of EDSs corresponding to the data object. The method then operates by dispersed error decoding the at least the decode threshold number of EDSs of the other set of EDSs corresponding to the data object to reproduce another data segment of the plurality of data segments. The method then continues by reproducing the data object based on the data segment of the plurality of data segments that is reproduced and the other data segment of the plurality of data segments that is reproduced.

In some examples, note that a decode threshold number of EDSs are needed to recover the data segment, and a read threshold number of EDSs provides for reconstruction of the data segment. The set of EDSs is of pillar width and includes a pillar number of EDSs, and each of the decode threshold, the read threshold, and the write threshold is less than the pillar number. Also, in some examples, the write threshold number is greater than or equal to the read threshold number that is greater than or equal to the decode threshold number.

Note that such a computing device performing the method may be implemented and located at a first premises that is remotely located from at least one SU of the plurality of SUs within the DSN. Also, note that such a DSN may include a wireless communication system, a wire lined communication systems, a non-public intranet system, a public internet system, a local area network (LAN), and/or a wide area network (WAN).

This disclosure presents, among other things, various examples of operations that may be performed by an appropriately configured computing device. One example includes a computing device (e.g., a DS processing unit) that is configured to interact with a dispersed or distributed storage network (DSN) memory that includes a number of storage units (SUs). Considering at least one example, a communication system includes a large cell private wireless communication system and a small cell public wireless communication system utilized to communicate data to a plurality of multimode user devices. The data is encoded to produce a plurality of sets of encoded data slices. Each public system cell site sends a unique combination of less than a decode threshold number of slices per set. The private system sites send remaining slices per set (e.g., to achieve at least a decode threshold number) to the user device based on an association of the private site to one of more local public sites. The user device decodes a decode threshold number of slices per set to reproduce the data when the user device is substantially in a favorable geographic location (e.g., receiving proper slices from both systems).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure)

or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed or distributed storage network (DSN), a first wireless communication system, and a second wireless communication system;
memory that stores operational instructions; and
a processing module operably coupled to the interface and to the memory, wherein the processing module, when operable within the computing device based on the operational instructions, is configured to:
receive, from the first wireless communication system, less than a decode threshold number of encoded data slices (EDSs) of a set of EDSs corresponding to a data object, wherein the data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment;
receive, from the second wireless communication system, at least one remaining EDS corresponding to the set of EDSs corresponding to the data object;

combine the less than the decode threshold number of EDSs of the set of EDSs and the at least one remaining EDS to generate at least the decode threshold number of EDSs of the set of EDSs corresponding to the data object; and dispersed error decode the at least the decode threshold number of EDSs of the set of EDSs corresponding to the data object to reproduce the data segment of the plurality of data segments.

2. The computing device of claim 1, wherein the processing module, when operable within the computing device based on the operational instructions, is further configured to:

receive, from the first wireless communication system, less than the decode threshold number of EDSs of another set of EDSs corresponding to the data object;

receive, from the second wireless communication system, at least one other remaining EDS of the another set of EDSs corresponding to the data object;

combine the less than the decode threshold number of EDSs of the another set of EDSs and the at least one other remaining EDS to generate another at least the decode threshold number of EDSs of the another set of EDSs corresponding to the data object;

dispersed error decode the at least the decode threshold number of EDSs of the another set of EDSs corresponding to the data object to reproduce another data segment of the plurality of data segments; and reproduce the data object based on the data segment of the plurality of data segments that is reproduced and the another data segment of the plurality of data segments that is reproduced.

3. The computing device of claim 1, wherein:

the less than the decode threshold number of EDSs of the set of EDSs corresponding to the data object corresponds to a unique subset of EDSs of the set of EDSs corresponding to the data object and is received from a first site of the first wireless communication system; and less than the decode threshold number of EDSs of another set of EDSs corresponding to the data object corresponds to another unique subset of EDSs of the another set of EDSs corresponding to the data object and is received from a second site of the first wireless communication system.

4. The computing device of claim 1, wherein:

the first wireless communication system includes a public wireless communication system; and the second wireless communication system includes a private wireless communication system.

5. The computing device of claim 1, wherein:

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

6. The computing device of claim 1, wherein the computing device is located at a first premises that is remotely located from at least one storage unit (SU) of a plurality of Storage units (SUs) within the DSN that distributedly store the set of EDSs.

7. The computing device of claim 1 further comprising:

a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:

an interface configured to interface and communicate with a dispersed or distributed storage network (DSN), a first wireless communication system, and a second wireless communication system;

memory that stores operational instructions; and a processing module operably coupled to the interface and to the memory, wherein the processing module, when operable within the computing device based on the operational instructions, is configured to:

receive, from the first wireless communication system, a plurality of unique subsets of less than a decode threshold number of encoded data slices (EDSs) per set of a plurality of sets of EDSs corresponding to a data object, wherein the data object is segmented into a plurality of data segments, wherein a data segment of the plurality of data segments is dispersed error encoded in accordance with dispersed error encoding parameters to produce a set of the plurality of sets of EDSs, wherein a decode threshold number of EDSs are needed to recover the data segment;

receive, from the second wireless communication system, at least one remaining EDS for each of the plurality of unique subsets of less than the decode threshold number of EDSs per set of the plurality of sets of EDSs corresponding to the data object;

combine EDSs from the plurality of unique subsets of less than the decode threshold number of EDSs per set of the plurality of sets of EDSs corresponding to the data object and the at least one remaining EDS for each of the plurality of unique subsets of less than the decode threshold number of EDSs per set of the plurality of sets of EDSs corresponding to the data object to generate at least the decode threshold number of EDSs for each of the plurality of sets of EDSs corresponding to the data object; and dispersed error decode the at least the decode threshold number of EDSs of the set of EDSs for each of the plurality of sets of EDSs corresponding to the data object to reproduce the plurality of data segments to reproduce the data object.

10. The computing device of claim 9, wherein:

a first unique subset of less than the decode threshold number of EDSs per set of the plurality of sets of EDSs of the data object is received from a first site of the first wireless communication system; and a second unique subset of less than the decode threshold number of EDSs per set of the plurality of sets of EDSs corresponding to the data object is received from a second site of the first wireless communication system.

11. The computing device of claim 9, wherein:

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

12. The computing device of claim 9 further comprising:
a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:

receiving, from a first wireless communication system and via an interface configured to interface and communicate with a dispersed or distributed storage network (DSN), the first wireless communication system, and a second wireless communication system, less than a decode threshold number of encoded data slices (EDSs) of a set of EDSs corresponding to a data object, wherein the data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment;

receiving, from the second wireless communication system and via the interface, at least one remaining EDS corresponding to the set of EDSs corresponding to the data object;

combining the less than the decode threshold number of EDSs of the set of EDSs and the at least one remaining EDS to generate at least the decode threshold number of EDSs of the set of EDSs corresponding to the data object; and dispersed error decoding the at least the decode threshold number of EDSs of the set of EDSs corresponding to the data object to reproduce the data segment of the plurality of data segments.

15. The method of claim 14 further comprising:
receiving, from the first wireless communication system and via the interface, less than the decode threshold number of EDSs of another set of EDSs corresponding to the data object;

receiving, from the second wireless communication system and via the interface, at least one other remaining EDS of the another set of EDSs corresponding to the data object;

combining the less than the decode threshold number of EDSs of the another set of EDSs and the at least one other remaining EDS to generate another at least the decode threshold number of EDSs of the another set of EDSs corresponding to the data object;

dispersed error decoding the at least the decode threshold number of EDSs of the another set of EDSs corresponding to the data object to reproduce another data segment of the plurality of data segments; and reproducing the data object based on the data segment of the plurality of data segments that is reproduced and the another data segment of the plurality of data segments that is reproduced.

16. The method of claim 14, wherein:
the less than the decode threshold number of EDSs of the set of EDSs corresponding to the data object corresponds to a unique subset of EDSs of the set of EDSs corresponding to the data object and is received from a first site of the first wireless communication system; and less than the decode threshold number of EDSs of another set of EDSs corresponding to the data object corresponds to another unique subset of EDSs of the another set of EDSs corresponding to the data object and is received from a second site of the first wireless communication system.

17. The method of claim 14, wherein:
the first wireless communication system includes a public wireless communication system; and
the second wireless communication system includes a private wireless communication system.

18. The method of claim 14, wherein:
a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

19. The method of claim 14, wherein the computing device includes a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *